(12) United States Patent
Kasai (10) Patent No.: US 8,487,586 B2
(45) Date of Patent: Jul. 16, 2013

(54) BATTERY PACK

(75) Inventor: Masakatsu Kasai, Kanagawa (JP)

(73) Assignee: NEC Energy Devices, Ltd., Kanagawa (JP)

( * ) Notice: Subject to any disclaimer, the term of this patent is extended or adjusted under 35 U.S.C. 154(b) by 203 days.

(21) Appl. No.: 13/054,432

(22) PCT Filed: Jul. 15, 2009

(86) PCT No.: PCT/JP2009/062829
§ 371 (c)(1),
(2), (4) Date: Jan. 14, 2011

(87) PCT Pub. No.: WO2010/008026
PCT Pub. Date: Jan. 21, 2010

(65) Prior Publication Data
US 2011/0115437 A1       May 19, 2011

(30) Foreign Application Priority Data
Jul. 16, 2008   (JP) .................................. 2008-184535

(51) Int. Cl.
*H02J 7/00*        (2006.01)
*H01M 6/44*        (2006.01)

(52) U.S. Cl.
USPC ............. 320/134; 320/107; 320/112; 429/99; 429/159; 429/164

(58) Field of Classification Search
USPC ........................................................ 320/134
See application file for complete search history.

(56) References Cited

U.S. PATENT DOCUMENTS

| | | | |
|---|---|---|---|
| 6,555,264 B1 * | 4/2003 | Hamada et al. | 429/156 |
| 6,818,343 B1 * | 11/2004 | Kimoto et al. | 429/99 |
| 2002/0140401 A1 * | 10/2002 | Watanabe et al. | 320/134 |
| 2003/0132732 A1 * | 7/2003 | Thomas et al. | 320/134 |
| 2004/0021442 A1 * | 2/2004 | Higashino | 320/112 |
| 2006/0257728 A1 * | 11/2006 | Mortensen et al. | 429/144 |
| 2007/0231702 A1 | 10/2007 | Fujita et al. | |

FOREIGN PATENT DOCUMENTS

| | | |
|---|---|---|
| JP | 2000-223160 A | 8/2000 |
| JP | 2002-100411 A | 4/2002 |
| JP | 2002-325375 A | 11/2002 |
| JP | 2007-273143 A | 10/2007 |
| JP | 2007-280679 A | 10/2007 |

OTHER PUBLICATIONS

Notice of Rejection dated Apr. 26, 2013 issued by the Japanese Patent Office in corresponding Japanese Patent Application No. 2008-184535.
Notice of Rejection dated Mar. 29, 2013 issued by the State Intellectual Property Office of P.R. China in corresponding Chinese Patent Application No. 200980136148.5.

\* cited by examiner

*Primary Examiner* — Yalkew Fantu
(74) *Attorney, Agent, or Firm* — Sughrue Mion, PLLC (57) ABSTRACT

A battery pack includes a plurality of battery modules that house a plurality of unit cells in a case; and a protection circuit board that controls the charge and discharge of a plurality of the battery modules at once. The battery pack is highly flexible in series and parallel connection, high in assembly productivity and excellent in energy density.

5 Claims, 7 Drawing Sheets

BATTERY PACK

TECHNICAL FIELD

The present invention relates to a battery pack consisting of battery modules that are suitable for multiple series and parallel connection of secondary batteries.

BACKGROUND ART

In recent years, electronics devices, particularly such portable information devices as cellular phones, laptop personal computers and camcorders, have improved in performance and become popular, creating greater demand for small and lightweight secondary batteries whose energy density is high. A study of more advanced batteries is under way. In particular, a lithium ion secondary battery, one of such secondary batteries, is gaining attention.

The lithium ion secondary battery is made in the following manner: Positive electrodes, where positive electrode active material layers are formed on positive electrode current collector surfaces, and negative electrodes, where negative electrode active material layers are formed on negative electrode current collector surfaces, are stacked via separators made of a porous synthetic resin film and impregnated with an electrolytic solution before being turned into battery elements. The positive electrode active material layers are made of positive electrode active material powder, such as lithium cobalt composite oxide, conductive powder, and binder; the positive electrode current collector surfaces are made of aluminum foil. The negative electrode active material layers are made of carbonaceous negative electrode active material powder and binder; the negative electrode current collector surfaces are made of copper foil.

In order for batteries to serve as a power source for electric vehicles or the like, it is necessary for many unit cells to be connected in series and parallel depending on the required electric capacity.

Figure 6:
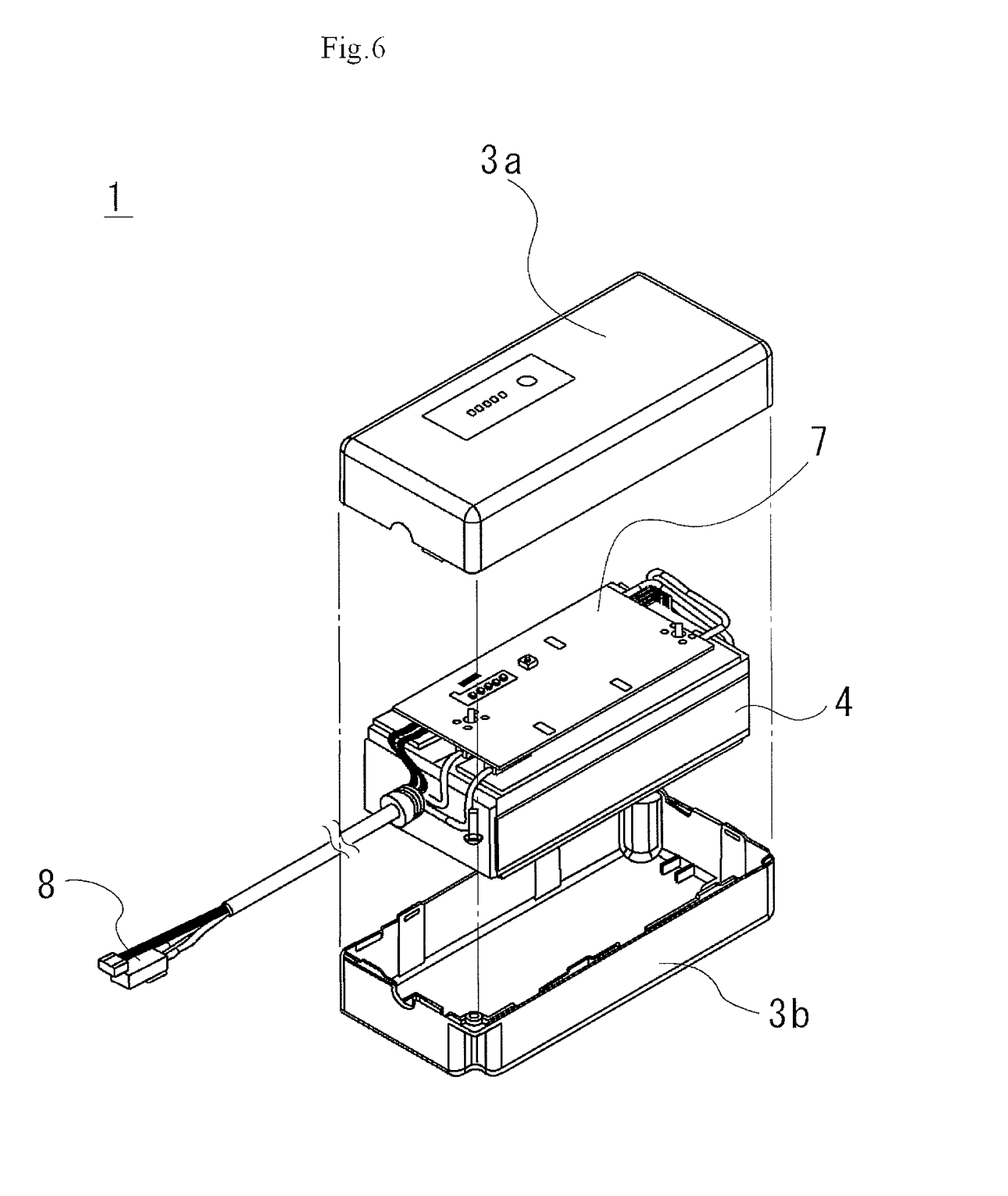
FIG. 6 is a diagram illustrating an example of a conventional battery pack.

FIG. 6 is a diagram illustrating an example of a conventional battery pack.

The battery pack shown in FIG. 6 is a large-capacity lithium ion battery pack consisting of seven unit cells. In a first casing portion 3a and second lid portion 3b of the battery pack 1, a protection circuit board 7 is mounted on an assembled battery 4 in which unit cells with a capacity of about 4.0 Ah are arranged in a 7-series, 1-parallel type; the battery pack 1 is equipped with a connection connector 8 for external connection.

Figure 7:
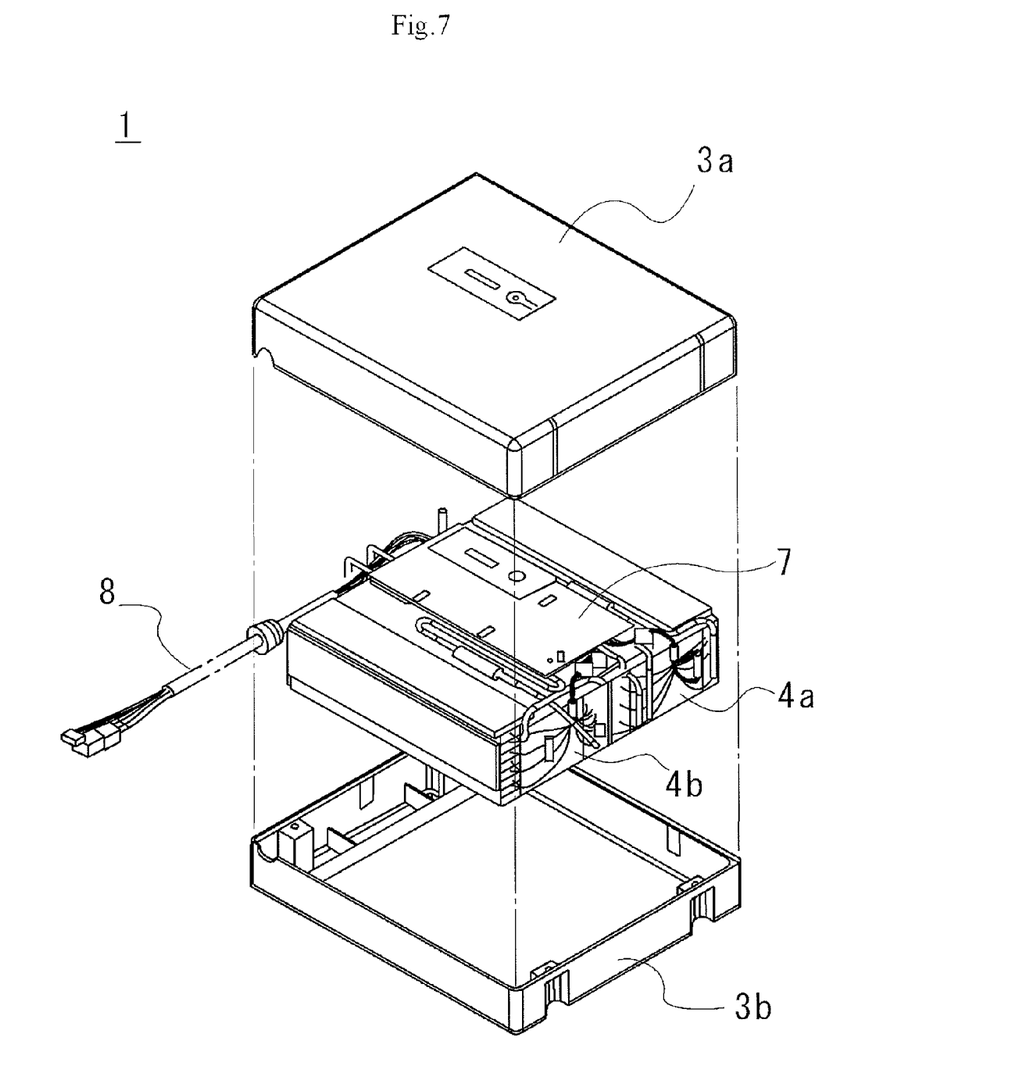
FIG. 7 is a diagram illustrating another example of a conventional battery pack.

FIG. 7 is a diagram illustrating another example of a conventional battery pack. The battery pack shown in FIG. 7 is a large-capacity lithium ion battery pack consisting of 14 conventional unit cells.

In a first casing portion 3a and second casing portion 3b of the battery pack, unit cells with a capacity of about 1.0 Ah are arranged in a 7-series, 1-parallel type to produce assembled batteries 4a and 4b, which are then connected in parallel so as to form the arrangement of a 7-series, 2-parallel type. In addition, a protection circuit board 7 is mounted; a connection connector 8 is provided for external connection.

For such battery packs, a protection circuit board is mounted in each battery pack to protect the battery against abnormalities during a charge and discharge process of the battery. Depending on the volume of the space occupied by the protection circuit board, the volume energy density decreases. For example, see Patent Document 1.

The production and maintenance of a battery pack in which unit cells are connected in series or parallel or in both series and parallel become more complex as the number of the unit cells increases.

What is known as a substitute for a battery pack in which unit cells are directly disposed is a battery pack that has, in a case, a plurality of battery modules in which a plurality of unit cells are stored.

When battery modules are used, depending on how various battery modules are combined, it is possible to make more efficient a process of assembling battery packs with various levels of electric power output.

Even in the battery modules, as in the case of the battery pack, a protection circuit board is provided for an assembled battery in which unit cells are connected in series or parallel or in both series and parallel. For example, see Patent Document 2.

For the protection circuit board, in general, various semiconductor elements are used. The semiconductor elements having a voltage and current resistance are used that are appropriate for the battery modules.

For example, suppose that, in order for a battery module with an output of 24 V to withstand the voltage, a protection circuit is made up of elements that withstand double the output voltage, i.e. 48 V. If the two modules are connected in series, there is no room left for voltage resistance. If the three modules are connected in series, the output voltage then exceeds the voltage that the elements can withstand; when abnormalities occur, the protection function may not work as the semiconductor elements break down. Accordingly, there is a limit to connecting battery modules together electrically.

There is also a method by which a protection circuit board is made up of components that withstand high voltages. However, the problem, among other things, is that the external dimensions of the components are large and that the components are expensive per unit. The components are unfavorable in terms of both volume and prices.

PRIOR ART DOCUMENTS

Patent Documents

Patent Document 1: JP-A-2006-12805
Patent Document 2: JP-A-11-341693

DISCLOSURE OF THE INVENTION

Problems to be Solved by the Invention

The object of the present invention is to provide a highly reliable battery pack that is highly flexible in series and parallel connection with the use of common battery modules and high in assembly productivity, with the battery pack having a plurality of battery modules, in which assembled batteries consisting of a plurality of unit cells are stored, that are connected in series or parallel or in both series and parallel.

Means for Solving the Problems

According to the present invention, a battery pack includes: a plurality of battery modules that house a plurality of unit cells in a case; and a protection circuit board that controls the charge and discharge of a plurality of the battery modules at once.

In the battery pack, a current fuse is disposed on at least a positive-electrode-side input/output line or negative-electrode-side input/output line in the battery module.

In the battery pack, a battery voltage detection line is connected to the positive- or negative-electrode side of each unit cell in the battery module; and the battery voltage detection line that is taken out of the battery module is connected to the protection circuit board.

In the battery pack, the battery voltage detection line is connected to a chip fuse that has a plurality of electrically-isolated fuses formed on an insulating substrate and is taken out of the battery module.

In the battery pack, the unit cells are each covered with a film covering material.

In the battery pack, a positive electrode active material of each unit cell contains a lithium manganese composite oxide.

The battery pack of the present invention is the battery pack having the battery modules housed in a case made of synthetic resin or metal.

Advantages of the Invention

According to the present invention, it is possible to provide a battery pack that is highly flexible in the setting of output voltage and current in various series and parallel connections and high in assembly productivity and has a high volume energy density.

BRIEF DESCRIPTION OF THE DRAWINGS

FIG. 4 is a diagram providing a more detailed description of how battery voltage detection lines illustrated in FIG. 3 are connected.

BEST MODE FOR CARRYING OUT THE INVENTION

Hereinafter, embodiments of the present invention will be described in detail with reference to the accompanying drawings.

Figure 1:
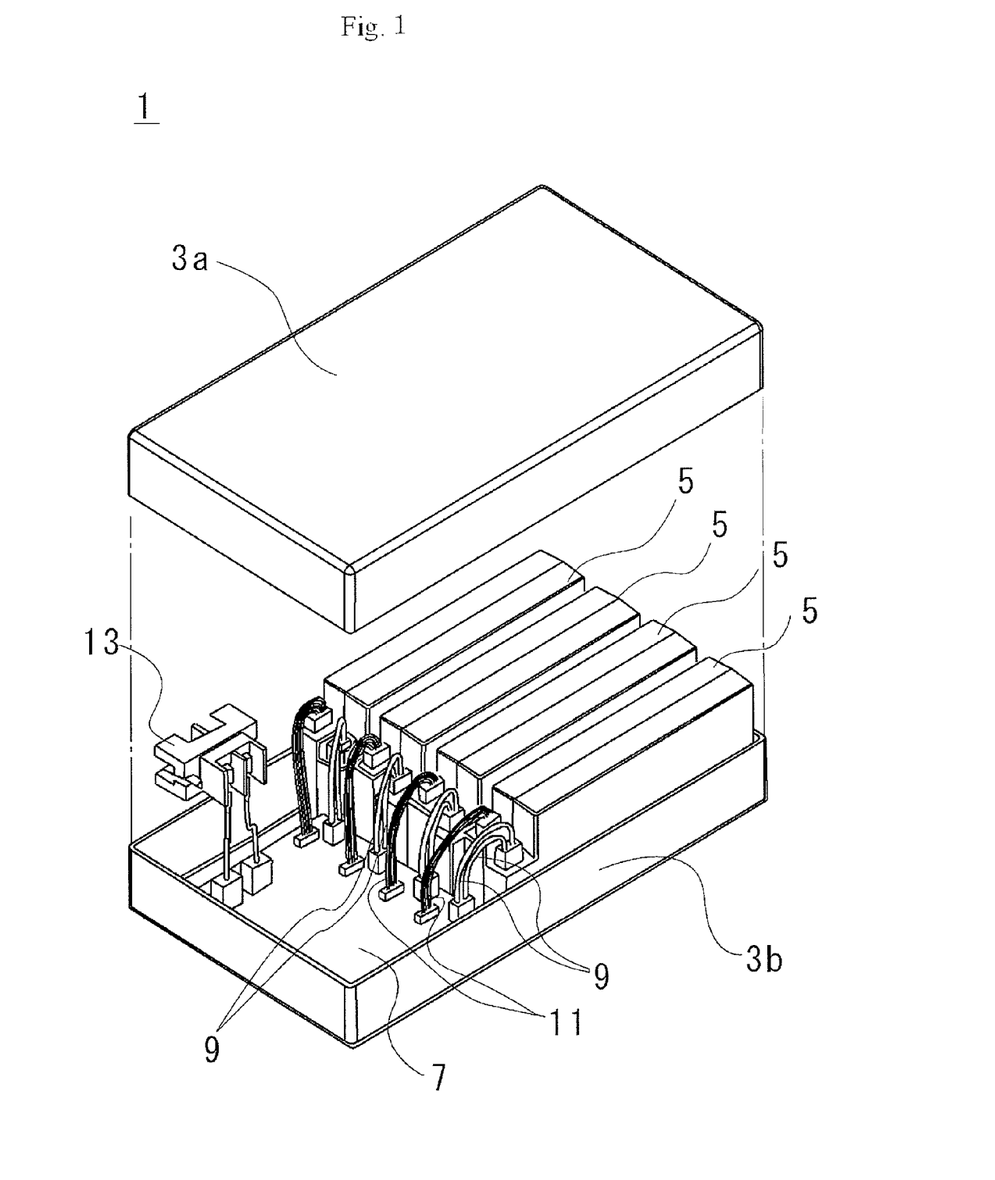
FIG. 1 is a diagram illustrating a battery pack according to the present invention and is an exploded perspective view of a case, a portion of which has been removed.

FIG. 1 is a diagram illustrating a battery pack according to the present invention. FIG. 1 is an exploded perspective view of a case, a portion of which has been removed.

The battery pack 1 of the present invention houses, in a case consisting of a first casing portion 3a and a second casing portion 3b, a plurality of battery modules 5 and a protection circuit board 7.

Battery module output lines 9, which are connected to the battery modules 5, and unit cell voltage detection lines 11 are connected to the protection circuit board 7. Moreover, what is connected to the protection circuit board 7 is an input/output unit 13 that enables the battery pack 1 to be electrically connected.

In the example here, the battery pack 1 houses four battery modules 5. The four battery modules 5 can be connected together in a 4-series, 1-parallel type, 2-series, 2-parallel type, 1-series, 4-parallel type, or the like. With the battery modules having the same configuration, it is possible to provide a battery pack with various levels of output voltage and current.

Since the battery module output lines 9 and unit cell voltage detection lines 11, which are connected to the battery modules 5, are connected to the protection circuit board 7 of the battery pack 1 of the present invention, it is possible to individually monitor the operating state of each of the cell units that make up the battery modules, making it possible to prevent overcharge, over-discharge, over-current, temperature anomalies and the like.

As descried above, since the protection circuit board 7 is provided in the battery pack, it is not necessary to provide the protection circuit board 7 to each of the unit cells or battery modules 5.

Moreover, on the protection circuit board 7, a selectable circuit is formed that allows the battery modules to be connected in an arbitrary series or parallel connection type or in an arbitrary series and parallel connection type. With the use of the same battery modules 5 and the same protection circuit board 7, it is possible to provide a battery pack with various levels of output voltage and current.

Figure 2:
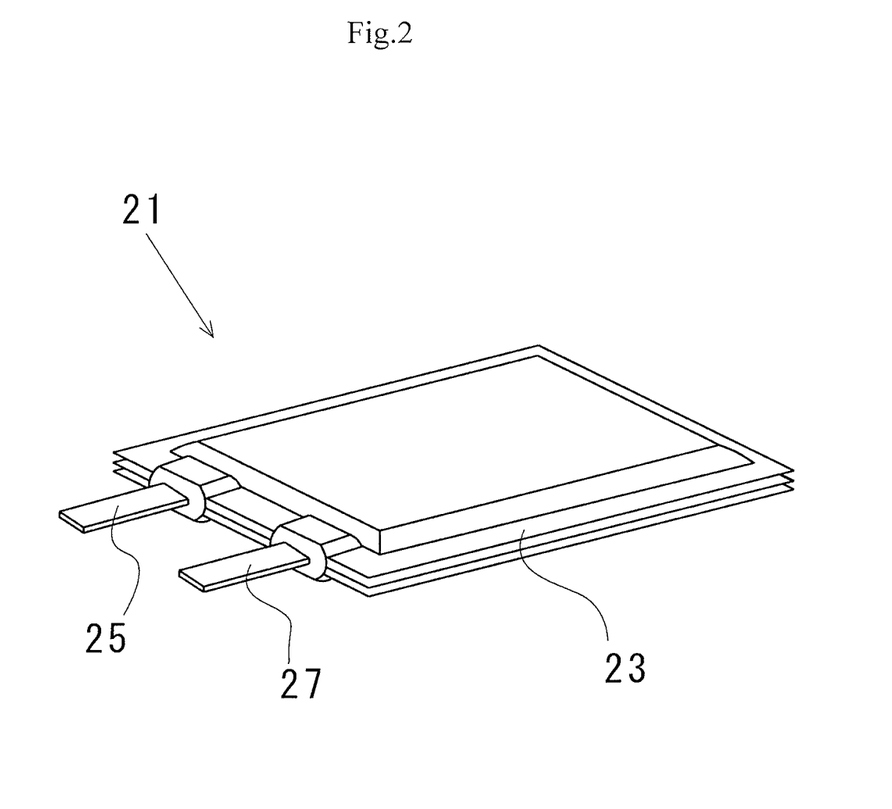
FIG. 2 is a diagram illustrating an example of a unit cell of a lithium ion secondary battery that is provided in a battery module that a battery pack of the present invention houses and is a perspective view.

FIG. 2 is a diagram illustrating an example of a unit cell of a lithium ion secondary battery that is provided in a battery module that the battery pack of the present invention houses. FIG. 2 is a perspective view.

An opening of the unit cell 21 of a lithium ion secondary battery is sealed by a film covering material 23; a positive electrode tab 25, which is connected to a positive electrode of a battery element, and a negative electrode tab 27, which is connected to a negative electrode, are taken out through sealing opening sections of the film covering material 23, respectively.

It is desirable that a thermal adhesive polyethylene film be disposed as the film covering material on an inner surface of the unit cell, a high-strength film of polyethylene terephthalate, polyamide film or the like be disposed on an outer surface, and a flexible laminated film, in which layers of aluminum foil are disposed and stacked, be used.

Moreover, the positive electrode can be made by applying slurry, in which particles of a lithium transition metal composite oxide and carbonaceous conductivity imparting materials such as carbon black are dispersed along with a binding agent, to a surface of a current collector made of aluminum foil.

For the lithium transition metal composite oxide, a lithium manganese composite oxide can be used. When the lithium manganese composite oxide is used, the battery, when being charged, is safer than those for which a lithium cobalt composite oxide is used. Therefore, it is possible to make simple the protection circuit of each unit cell. Thus, it is possible to reduce the battery modules in size.

The lithium manganese composite oxide may be an oxide that includes only lithium and manganese, or a composite oxide including other chemical elements.

The negative electrode can be made by applying slurry to a surface of copper foil: the slurry is obtained by mixing graphite, amorphous carbon powder, silicon and the like, which are used to get lithium doped or undoped, along with a binding agent.

For the battery pack of the present invention, various unit cells of different electric capacities can be used. It is possible to propose unit cells whose electric capacity is greater than or equal to 1 Ah and less than or equal to 500 Ah.

Figure 3:
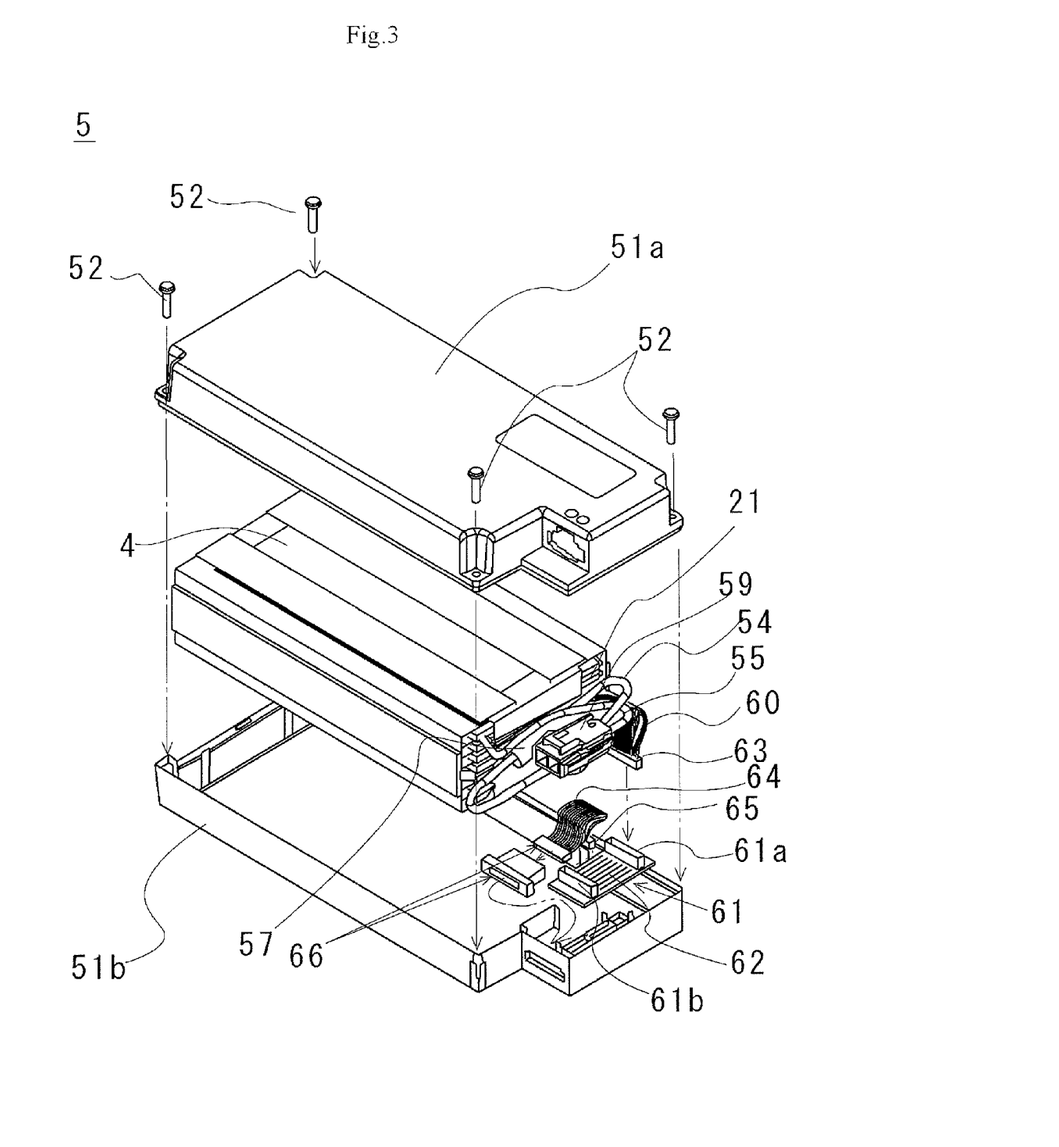
FIG. 3 is a diagram illustrating a battery module housed in a battery pack according to an embodiment of the present invention and is an exploded perspective view.

FIG. 3 is a diagram illustrating the battery module housed in the battery pack according to an embodiment of the present invention. FIG. 3 is an exploded perspective view.

The battery module 5 includes an assembled battery 4 in battery module cases 51a and 51b: the assembled battery 4 contains a plurality of unit cells 21. For the battery module cases 51a and 51b, the following materials can be used: synthetic resin such as polycarbonate or ABS resin, or a metallic material such as aluminum, mild steel or stainless steel. The battery module cases 51a and 51b are connected together with screws 52.

When synthetic resin materials are used as components of the cases, it is possible to prevent a portion to which a voltage is applied from short-circuiting when the portion comes in contact with the cases. Meanwhile, it is desirable that metallic materials be used if a heat release characteristic and the strength of the cases are required.

In the example here, in the battery module 5, seven unit cells 21 are connected in series to form the assembled battery 4. The shape of the unit cells, the number of the unit cells to be connected, and an electrical connection method may vary appropriately according to the intended use.

The following are provided in the present battery module 5: a positive-electrode-side input/output line 54 of the assembled battery 4, a negative-electrode-side input/output line 55 of the assembled battery, and a battery voltage detection line 60, which is taken out of each unit cell and is used to monitor the voltage of each unit cell.

On the positive-electrode-side input/output line 54, a current fuse 57 is provided to protect against short-circuiting. To the battery voltage detection line 60, a chip fuse 61 is connected to prevent the voltage detection line from short-circuiting.

In the cases, an input/output line external connection connector 59 and a battery voltage detection line external connection connector 66 are provided; no protection circuit board is mounted.

In the example shown in FIG. 3, the chip fuse 61 for voltage detection lines includes a plurality of electrically-isolated fuses 62, the number of which corresponds to the number of voltage detection lines, on an insulating substrate.

The voltage-detection-line chip fuse 61 includes connectors 61a and 61b, which enable a plurality of circuits to be connected at the same time. Accordingly, what is connected to one connector 61a is a connector 63 having a plurality of electrical contact points that are connected to the battery voltage detection line 60. What is connected to the other connector 61b is an output-side battery voltage detection line 65 that is connected to a battery voltage detection line external connection connector 64. Therefore, the connector 61b is connected to a battery voltage detection line output-side connector 66, enabling all the battery voltage detection lines to be connected at the same time.

The current fuse 57 of the positive-electrode-side input/output line 54 for protecting against short-circuiting varies according to batteries or devices in which batteries are used. In order to ensure safety, it is desirable that a fuse rated at 30 A or more be applied for a 24 V system, and the one rated at 100 A or more for a system that is used in a driving system and requires a large current.

The positive-electrode-side input/output line 54 and the negative-electrode-side input/output line 55 connect an assembled battery 53 and the input/output line external connection connector 59. The line material that is applied to the positive-electrode-side input/output line 54 and the negative-electrode-side input/output line 55 is selected appropriately according to the required amount of current. It is preferable that the material have a thickness of the AWG#14th line (with a diameter of 1.628 mm) or more. It is preferable that the negative-electrode-side input/output line 55 have a thickness of the AWG#30th line (with a diameter of 0.2546 mm) or more. The above electrical connection may be achieved by a busbar made of a metallic plate such as copper or aluminum, instead of the line material.

Figure 4A:
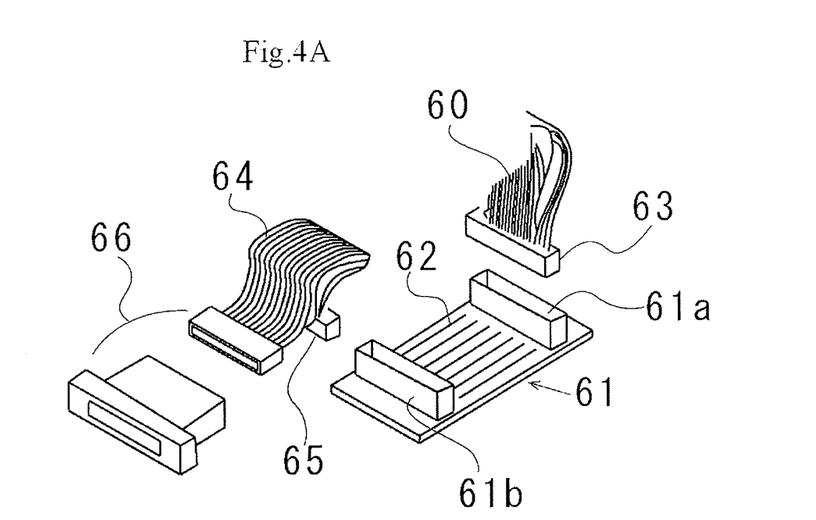
FIG. 4A is a perspective view illustrating a chip fuse and a connection section.
Figure 4B:
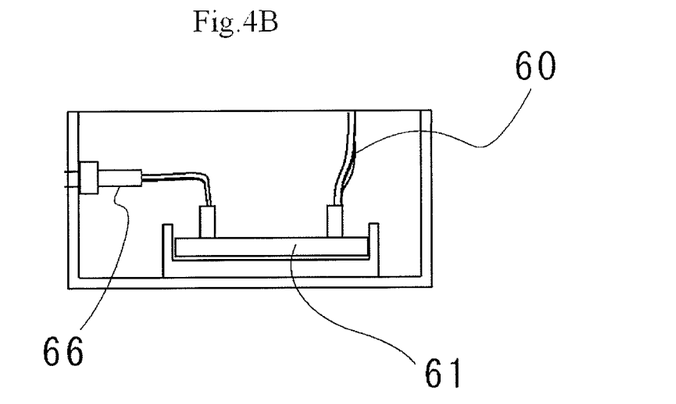
FIG. 4B is a side view illustrating how the chip fuse is attached.
Figure 4C:
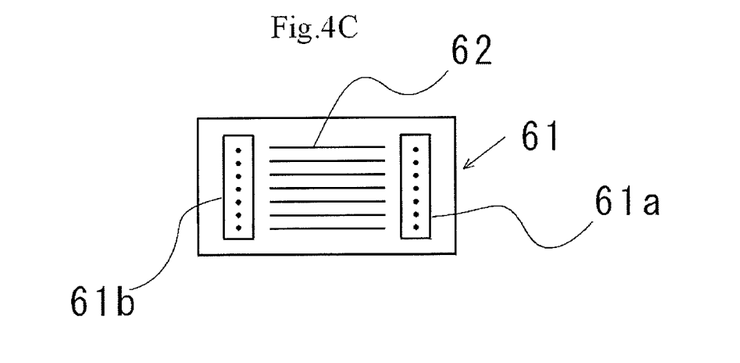
FIG. 4C is a top view of the chip fuse.

FIG. 4 is a diagram providing a more detailed description of how the battery voltage detection lines illustrated in FIG. 3 are connected. FIG. 4A is a perspective view illustrating a chip fuse and a connection section. FIG. 4B is a side view illustrating how the chip fuse is attached. FIG. 4C is a top view of the chip fuse.

The chip fuse 61 is equipped with a plurality of the electrically-isolated fuses 62 and has the connectors 61a and 61b, which enable a plurality of the fuses 62 to be electrically connected at the same time. Accordingly, what is connected to one connector 61a is the connector 63 having a plurality of electrical contact points that are connected to the battery voltage detection line 60. What is connected to the other connector 61b is the connector 65 that is connected to the output-side battery voltage detection line 64. Therefore, a plurality of the battery voltage detection lines is connected together.

On the output-side battery voltage detection line 64, the battery voltage detection line output-side connector 66 is provided. Therefore, it is possible to supply the voltage of the battery to the protection circuit provided in the battery pack.

The chip fuse equipped with a plurality of fuses is provided. Therefore, it is possible to connect all the battery voltage detection lines together at the same time. The connectors in use do not expose a portion to which a voltage is applied. Therefore, it is possible to form highly reliable electric connections.

Figure 5:
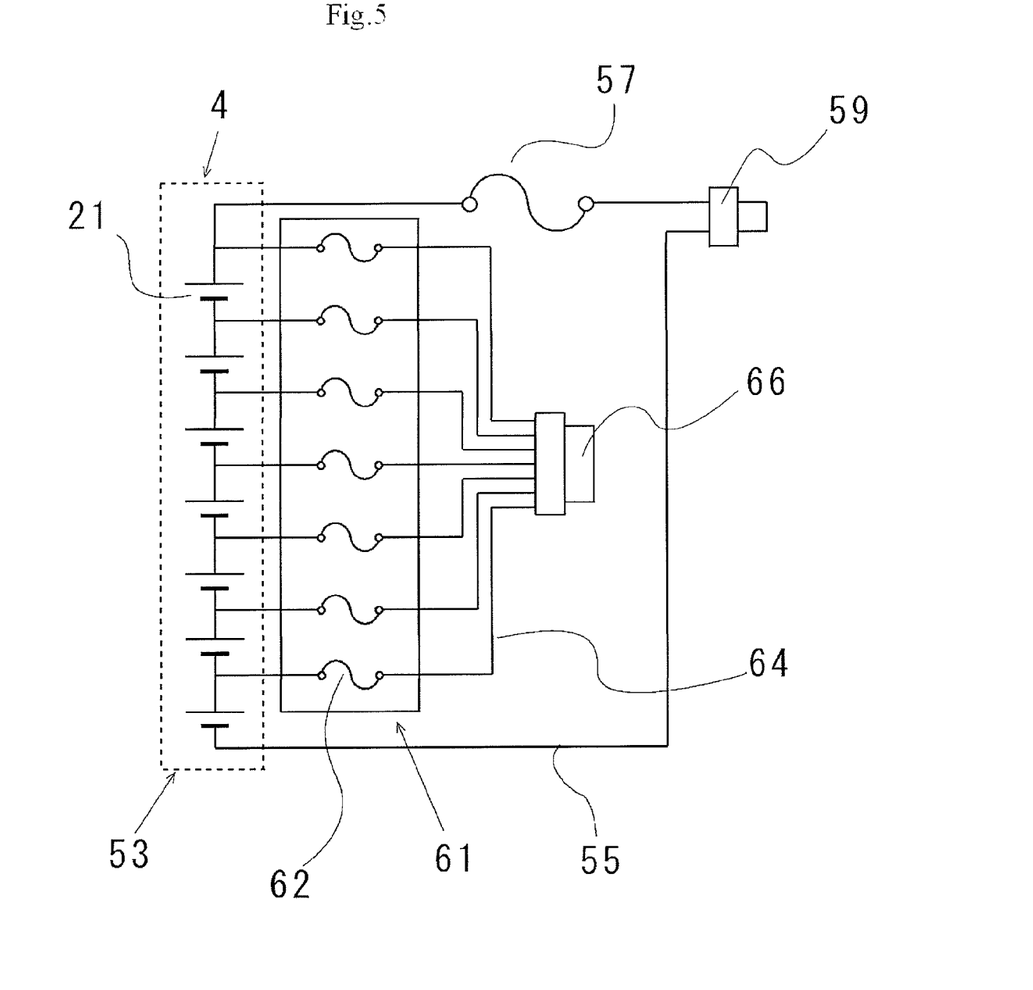
FIG. 5 is a diagram illustrating the electric wiring of a battery module according to an embodiment of the present invention.

FIG. 5 is a diagram illustrating the electric wiring of the battery module according to an embodiment of the present invention.

In the example shown in FIG. 5, the assembled battery 4 is made up of seven unit cells 21 that are connected in series.

The positive-electrode-side input/output line 54 that is taken out from a positive electrode of a unit cell positioned at one end of a laminated body of the assembled battery 4 is connected. The negative-electrode-side input/output line 55 that is taken out from a negative electrode of a unit cell positioned at the other end of the laminated body of the above assembled battery is connected. The positive-electrode-side input/output line 54 is connected to the input/output line external connection connector 59 through the current fuse 57 and to the battery protection board.

Meanwhile, the battery voltage detection line 60 is connected to the positive-electrode side of each unit cell and to the seven electrically-isolated fuses 62 provided in the chip fuse 61.

The output-side battery voltage detection line 64, which is positioned at the output side of the chip fuse 61, is connected to the battery voltage detection line external connection connector 66 and to the battery protection circuit through the connector.

The present battery module does not include a protection circuit that protects the charge and discharge of the battery in the battery module, allowing a plurality of battery modules to be freely connected in series or parallel or in both series and parallel depending on the required voltage or current.

The number of cells connected in series to make up an assembled battery is set appropriately according to the voltage or current required for a device that uses the battery. There is a 12 V or 24 V system as a typical voltage of the device that uses the battery. However, in the case of the lithium ion secondary battery, it is preferable that three to four cells be connected in series for the 12 V system, and six to eight cells be connected in series for the 24 V system. It is also possible to support various voltages, such as 36 V or 42 V, by varying the number of cells connected in series.

EXAMPLES

The following describes the present invention by illustrating examples.

Example 1

A positive electrode of a lithium ion secondary battery is made in the following manner.

The slurry of a positive electrode active material layer is prepared by mixing and dispersing lithium manganese composite oxide powder, carbonaceous conductivity imparting materials, and polyvinylidene fluoride with a mass ratio of 90:5:5 into N-methyl-2-pyrrolidone (NMP) and churning. Then, the slurry is uniformly applied to both sides of a sheet of aluminum foil that is 20 μm in thickness with the use of a doctor blade to make the positive electrode.

For the negative electrode, the slurry of a negative electrode active material layer is prepared by mixing and dispersing amorphous carbon powder and polyvinylidene fluoride with a mass ratio of 91:9 into N-methyl-2-pyrrolidone (NMP) and churning. Then, the slurry is applied to both sides of a sheet of copper foil that is 10 μm in thickness with the use of a doctor blade to make the negative electrode.

A battery element in which a positive-electrode plate and a negative-electrode plate are stacked via a separator is impregnated with an electrolytic solution: the positive electrode active material layer and the negative electrode active material layer are applied to both sides of the positive-electrode plate and negative-electrode plate. An opening is also sealed by a film covering material to make a unit cell of the lithium ion secondary battery. The capacity of the unit cell is 4.0 Ah.

An assembled battery is made by connecting the seven secondary cells in series and then housed in a battery module case. A battery voltage detection line attached to each unit cell is connected to a connector at one end of a chip fuse that is equipped with seven electrically-isolated fuses; the other end of the chip fuse is connected to a connector for external connection.

A positive-electrode-side input/output line is connected to one end of a current fuse; the other end of the current fuse and a negative-electrode-side input/output line are connected to the connector for external connection.

A desired number of battery modules that are made as described above is housed in a battery pack and connected to a protection circuit board. Thus, the battery pack is made.

In one example, a battery pack, in which an assembled battery of seven unit cells connected in series is stored and a protection circuit board is mounted, is 90 mm wide, 210 mm long and 70 mm in thickness. When the four battery packs are combined, the volume comes to 5,292 $cm^3$.

Whereas the battery pack produced in the example houses four battery modules that do not have a protection circuit board and is 200 mm wide, 250 mm long and 100 mm in thickness; the volume comes to 5,000 $cm^3$.

In that manner, the protection circuit board is not provided to each battery module; only one protection circuit board is provided for the battery pack that houses four battery modules. Thus, it is possible to reduce the volume of the battery pack and therefore to improve the volume energy density.

The battery pack of the present invention is made by connecting, after the battery modules are produced, the connectors of the required number of the battery modules to the protection circuit board provided in the battery pack. Thus, it is possible to reduce the number of steps for assembly and therefore to improve productivity in producing the battery packs.

As for the battery module, instead of the one in which all four batteries are connected in series, a battery module of a 2-series, 2-parallel connection type can be used. Therefore, with the use of the battery modules having the same configuration, it is possible to produce battery packs of different output voltages and currents and improve flexibility in the way the battery packs are produced.

The battery pack of the present invention can be applied to a secondary battery that uses various active materials. In particular, a lithium ion battery is preferred that uses a lithium manganese composite oxide as a positive electrode active material that is highly safe when being charged. It is also possible to provide a battery pack that uses the protection circuit board only for the battery pack, but not for the battery modules.

Example 2

FIG. 7 is a diagram illustrating an example of a conventional battery pack. In a battery pack 1, unit cells are connected in a 7-series, 2-parallel type to produce an assembled battery and a protection circuit board is mounted. In a case that consists of a first casing portion 3a and a second casing portion 3b, two assembled batteries 53 in which seven unit cells are connected in series are connected in parallel. A protection circuit board 7 is positioned so as to come in contact with the assembled batteries.

The battery pack 1 is 180 mm wide, 210 mm long and 70 mm in thickness. When the four battery packs are connected, the total volume is 10,584 $cm^3$.

Meanwhile, when the same number of unit cells as in the above battery pack is used and when a battery pack houses four battery modules consisting of assembled batteries of a 7-series, 2-parallel connection type, the size of the battery pack is 380 mm wide, 250 mm long and 100 mm in thickness and the volume comes to 9,500 $cm^3$.

According to the present invention, it is possible to provide a battery pack that has a smaller volume than a battery pack where the same number of unit cells is used, a protection circuit board is provided in each battery pack and the output voltage and current are equal. Therefore, it is possible to provide a battery pack that is large in electric capacity per volume.

INDUSTRIAL APPLICABILITY

It is necessary to put a protection circuit board for the charge and discharge of a battery. The protection circuit board for the charge and discharge of the battery is not provided for each battery module consisting of assembled batteries in which unit cells of a relatively large capacity secondary battery, such as a lithium ion battery, are combined. A battery pack is provided with the protection circuit board only for the battery pack. Therefore, it is possible to provide the battery pack that is high in volume efficiency.

The invention claimed is:

1. A lithium ion battery pack comprising:
    a plurality of battery modules, each of the plurality of battery modules comprising a case that houses a plurality of unit cells in the case, a positive electrode active material of each of the unit cells being a lithium manganese composite oxide;
    a protection circuit board that controls a charge and discharge of the plurality of the battery modules at once;
    an input/output unit which enables the lithium ion battery pack to be electrically connected;
    battery module output lines which are connected to the battery modules; and
    unit cell voltage detection lines which are connected to the protection circuit board and which enable individual monitoring of an operating state of each of the unit cells.

2. The lithium ion battery pack according to claim 1, characterized in that:
    a current fuse is disposed on at least a positive-electrode-side input/output line or negative-electrode-side input/output line in each of the battery modules.

3. The lithium ion battery pack according to claim 1, characterized in that:
    a battery voltage detection line is connected to a positive- or negative-electrode side of each unit cell in each of the battery modules; and
    the battery voltage detection line that is taken out of each of the battery modules is connected to the protection circuit board.

4. The battery pack according to claim 3, characterized in that:
    the battery voltage detection line is connected to a chip fuse that has a plurality of electrically-isolated fuses formed on an insulating substrate and is taken out of each of the battery modules.

5. The battery pack according to claim 1, characterized in that:
    each unit cell is covered with a film covering material.

* * * * *